United States Patent
Park

(10) Patent No.: US 7,318,112 B2
(45) Date of Patent: Jan. 8, 2008

(54) UNIVERSAL INTERFACE SIMULATING MULTIPLE INTERFACE PROTOCOLS

(75) Inventor: Edwin Park, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1120 days.

(21) Appl. No.: 09/975,364

(22) Filed: Oct. 11, 2001

(65) Prior Publication Data

US 2003/0093598 A1 May 15, 2003

(51) Int. Cl.
*G06F 3/00* (2006.01)
*G06F 13/12* (2006.01)
*H04J 15/00* (2006.01)

(52) U.S. Cl. .................... 710/36; 710/48; 710/62; 710/63; 370/464

(58) Field of Classification Search .................. 710/62, 710/63, 36, 48
See application file for complete search history.

(56) References Cited

U.S. PATENT DOCUMENTS

| | | | | |
|---|---|---|---|---|
| 4,041,473 A * | 8/1977 | Bardotti et al. | ............... | 710/63 |
| 4,079,452 A * | 3/1978 | Larson et al. | ................. | 710/11 |
| 5,025,412 A * | 6/1991 | Dalrymple et al. | ........... | 710/63 |
| 5,165,022 A * | 11/1992 | Erhard et al. | ................... | 710/63 |
| 5,349,649 A * | 9/1994 | Iijima | ......................... | 709/228 |
| 5,420,412 A * | 5/1995 | Kowalski | .................... | 235/492 |
| 5,428,806 A * | 6/1995 | Pocrass | ...................... | 710/104 |
| 5,533,097 A * | 7/1996 | Crane et al. | ............. | 455/552.1 |
| 5,579,531 A * | 11/1996 | Sugita | .......................... | 710/51 |
| 5,870,626 A * | 2/1999 | Lebeau | ........................ | 710/11 |
| 5,875,415 A * | 2/1999 | Lieb et al. | .................. | 702/122 |
| 5,964,852 A * | 10/1999 | Overton | ....................... | 710/62 |
| 6,009,463 A * | 12/1999 | Brandt et al. | ............... | 709/213 |
| 6,088,749 A * | 7/2000 | Hebert et al. | ................ | 710/105 |
| 6,119,226 A * | 9/2000 | Shiau et al. | ................... | 713/2 |
| 6,151,390 A * | 11/2000 | Volftsun et al. | ............ | 379/229 |
| 6,189,052 B1 * | 2/2001 | Nilsson et al. | ................ | 710/48 |
| 6,216,188 B1 * | 4/2001 | Endo et al. | .................. | 710/302 |
| 6,263,392 B1 * | 7/2001 | McCauley | .................. | 710/305 |
| 6,334,160 B1 * | 12/2001 | Emmert et al. | ............... | 710/11 |
| 6,493,355 B1 * | 12/2002 | Henderson et al. | ......... | 370/468 |
| 6,529,743 B1 * | 3/2003 | Thompson et al. | ......... | 455/557 |
| 6,742,071 B1 * | 5/2004 | Boynton et al. | ............ | 710/305 |
| 6,973,658 B2 * | 12/2005 | Nguyen | ...................... | 719/327 |
| 7,114,019 B2 * | 9/2006 | Henry et al. | ................ | 710/100 |

* cited by examiner

*Primary Examiner*—Alan S. Chen
(74) *Attorney, Agent, or Firm*—Alan K. Stewart; W. James Brady; Frederick J. Telecky, Jr.

(57) ABSTRACT

A universal interface interfaces between a variety of different data processing devices by the generation, storage, proper routing, and timed output of data signals to simulate behavior of a traditional interface device dedicated to that particular communications protocol. The interface is universal because it is easily reconfigured to interface a general purpose processor with a number of communications devices, despite contrasting interface protocols, pin configuration, and other characteristics. Initially, the controller receives identification of a peripheral device's particular communications protocol. As for its input function, the controller responds to input data signals upon input/output pads by routing the signals into memory and later downloading the signals from memory under prescribed timing. As for its output function, the controller generates converted data signals complying with the peripheral's communications protocol, stores the converted data signals in the memory, and directs the memory to output the converted data signals with prescribed timing to simulate behavior of a traditional interface device dedicated to the selected communications protocol.

7 Claims, 4 Drawing Sheets

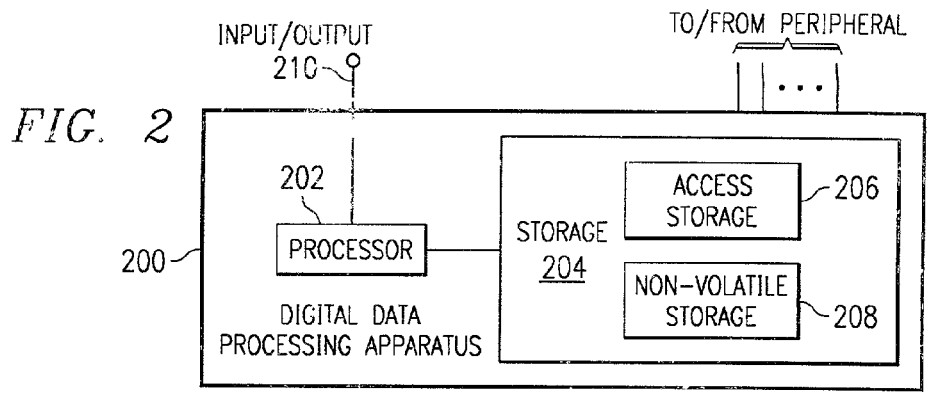
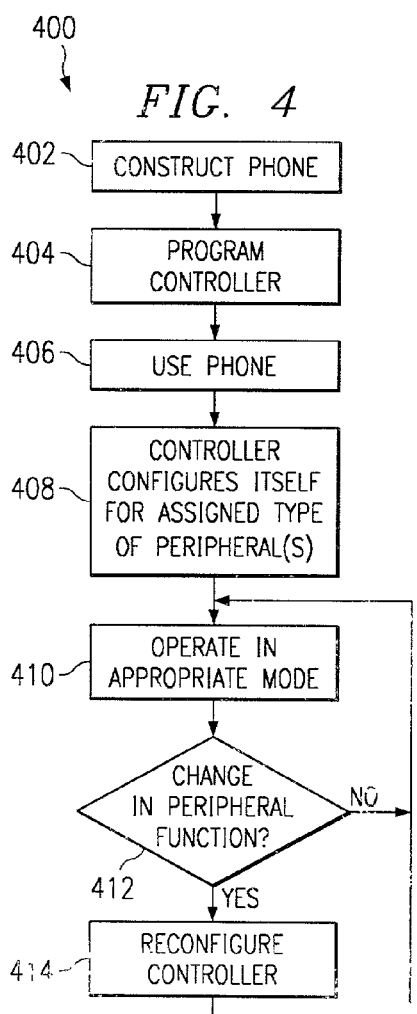
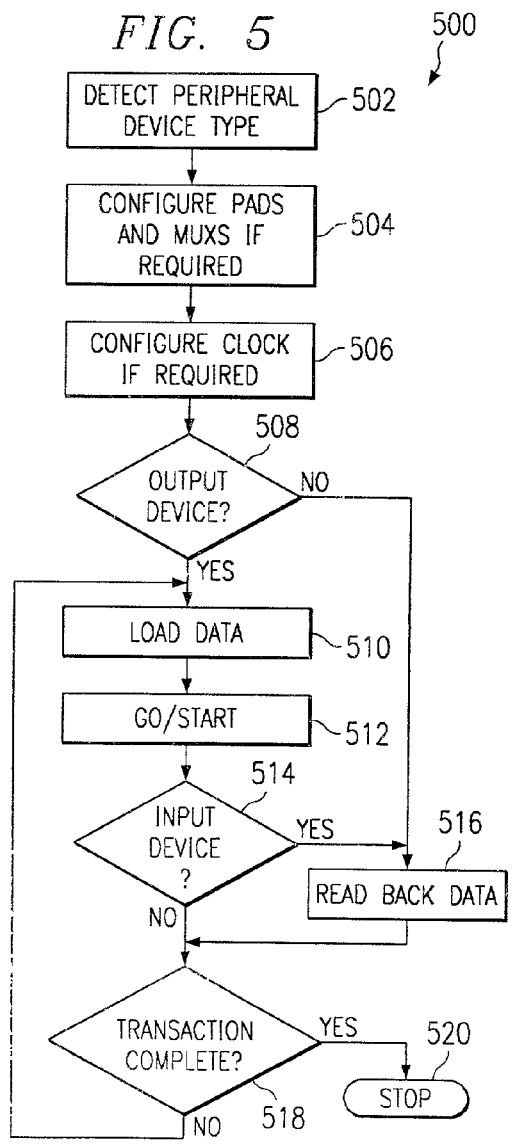

UNIVERSAL INTERFACE SIMULATING MULTIPLE INTERFACE PROTOCOLS

TECHNICAL FIELD

The present invention relates to interfaces between communications between electronic devices that process digital and/or analog signals. More particularly, the invention concerns an apparatus that universally interfaces between a variety of different devices that use different communication protocols by simulating the behavior of an interface device that is dedicated to that particular communications protocol.

BACKGROUND

With today's vibrant technology marketplace, industry competition and consumer demand spurs manufacturers to continually improve the performance of their electronic devices. Increases frequently occur in many areas such as processing speed, storage capability, compactness, and functionality. Unfortunately, there are tradeoffs, as advances in one area often come at the expense of performance in another area. As one example, functionality and compactness oppose each other in many cases. Additions of new circuit functions typically require larger processors, greater storage size, and a larger overall package. Conversely, size reductions often come at the expense of processing speed, memory, or functionality.

This problem is especially acute with compact wireless telephones, which are more useful, marketable, and functional when their internal circuitry is capable of exchanging data with a diverse assortment of peripheral devices. One example such an internal circuit is a mobile baseband integrated circuit (IC), which serves as a central signal-processing element in a wireless telephone. To satisfy consumer requirements, it may be desirable for the mobile baseband IC to communicate with peripheral devices of diverse communications formats, such as stereo voice (e.g., MP3 sound), mono voice (e.g., audio codec), Bluetooth (to communicate with nearby wireless consumer devices), radio frequency (RF) formats (for an analog chipset for utilizing traditional "analog" cellular bands), and others. Peripheral devices include not only devices external to the wireless telephone itself, but also any circuitry internal to the wireless telephone and external to the baseband IC. To achieve broader compatibility with all of these diverse peripheral devices, and ultimately increase functionality, engineers are forced to add a new interface circuit for each different communications protocol (format) that needs to be supported. Clearly, these added interface come at the expense of circuit compactness as well as increases the cost of the design.

To preserve compactness while providing some degree of functionality, some wireless engineers design chips that are compatible with a selected number of the most popular peripherals. For those telephone consumers requiring a greater level of functionality, this approach may not be entirely satisfactory. This approach can also present future difficulties to the engineers, when they are required to design and manufacture a new circuit each time a decision is made to communicate with a new peripheral. Adding the necessary hardware interface circuits incurs costs in designing, tooling, and manufacturing the circuit all over again.

Another problem presented by prior art interface circuits is that they are typically designed such that they are not modifiable (e.g., hardware design) once designed. This is a concern for example if a new multi-media card (MMC) that could have been used by the wireless telephone is introduced but the communications protocol used by the new MMC has been updated and is no longer compatible with the MMC interface circuit supported by the wireless telephone. Consequently, known multi-peripheral interface circuits are not completely adequate for some applications due to some of the problems previously mentioned.

SUMMARY OF THE INVENTION

Broadly, the present invention concerns an apparatus that universally interfaces between a variety of different data processing devices by the generation, storage, proper routing, etc. of signals to simulate behavior of a traditional interface device dedicated to that particular communications protocol. The interface is universal because it is easily reconfigured to interface with many different types of devices, despite contrasting interface protocols, pin configuration, and other characteristics. For example, the apparatus may be selectively configured to interface the processor with a serial peripheral interface (SPI) device.

The universal interface apparatus employs a controller, program storage, and clock. Pads or other access lines are provided for coupling to the device to be interfaced, called a "peripheral" device. A peripherial device can be any device external to the universal interface apparatus and can include devices internal to the universal interface apparatus host (e.g., wireless telephone). The controller selectively reconfigures components such as the clock, memory, and optional multiplexer(s) to interface the controller with an off-circuit, device or circuit attached to the pads. Additionally, by utilizing techniques such as time multiplexing, the controller may further direct the apparatus to concurrently interface with multiple off-circuit devices coupled to the pads.

The controller initially receives identification of a peripheral device's particular communications protocol. As for its input function, the controller responds to input data signals upon input/output pads by routing the signals into memory and later downloading the signals from memory under prescribed timing. As for its output function, the controller responds to output signals by generating converted data signals complying with the peripheral's communications protocol, storing the converted data signals in the memory, and directing the memory to output the converted data signals with prescribed timing to simulate behavior of a traditional interface device dedicated to the selected communications protocol.

The invention may be implemented to provide a method to universally interface a general purpose processor with a variety of different data processing devices by the generation, storage, proper routing, and timed input and/or output of data signals to simulate behavior of a traditional interface device dedicated to that particular communications protocol. In another embodiment, the invention may be implemented to provide a universal interface apparatus. The invention affords its users with a number of distinct advantages. For example, the invention facilitates especially compact circuit designs by providing a single, universal interface apparatus compatible with a variety of different peripherals, instead of requiring a different interface for each type of peripheral. The invention also provides greater functionality than prior designs, which sacrificed compatibility with certain peripherals in order to conserve circuit size. Additionally, the universal interface of this invention is cost-effective because there is no need for circuit purchasers to pay for hardware-dedicated interfaces that they do not need. In addition, the invention avoids the need to redesign hardware just because a decision is made to interface an existing product with new or different peripherals. And, because the interface apparatus of this invention utilizes reconfigurable programming rather than dedicated hardware devices, the invention anticipates future programmers writing interface code tailored to future communication protocols that do not exist today. Furthermore, unlike the prior art where processor interrupts degrade performance, the invention enhances interface performance by utilizing memory as discussed herein. Another example is the reduction in gates and complexity in the design of the invention's universal interface apparatus, since one universal interface is used to drive several peripherals. As a further benefit, each peripheral device benefits from the additional memory, bandwidth, features, and the like provided by the universal interface in contrast to the limited resources available under a dedicated interface system. The invention also provides a number of other advantages and benefits, which should be apparent from the following description of the invention.

BRIEF DESCRIPTION OF THE DRAWINGS

FIG. 2 is a block diagram of a digital data processing machine according to the invention.

FIG. 4 is a flowchart showing a sequence for the construction and use of a multi-function handheld telephone employing a universal interface according to the invention.

FIG. 5 is flowchart showing details of a configuration and operating sequence for a universal interface according to the invention.

DETAILED DESCRIPTION OF THE PREFERRED EMBODIMENT

The nature, objectives, and advantages of the invention will become more apparent to those skilled in the art after considering the following detailed description in connection with the accompanying drawings.

Hardware Components & Interconnections

The present invention provides a "universal" interface apparatus (UIA). The interface is universal because it can be easily reconfigured to interface with a variety of communications devices, despite contrasting interface protocols, pin configuration, and other characteristics. In one example, the apparatus may be selectively configured to interface with a serial peripheral interface (SPI) device.

In the preferred embodiment, the universal interface apparatus is able to support a number of 2-4 wire (line) devices using a software programmable block in which the control and data waveforms needed to support the protocols are all run time programmable. The UIA is able to support as illustrative example, protocols such as I2S, SSP, I2C, SPI, SBI, synthesizer programming, etc. Also, for SSP/PCM the UIA will not only support basic modes line 8 kHz voice, but will also support a variety of data sync waveforms, slots and data rates. The UIA will also allow the pads (interface pins) to change mode from one protocol to another at set up or run time to support the various needs of the application and customers. Optionally, multiplexers can also be used in order to allow the UIA to support multiple peripheral devices in a time multiplexed environment using the same interconnection pads.

Figure 1A:
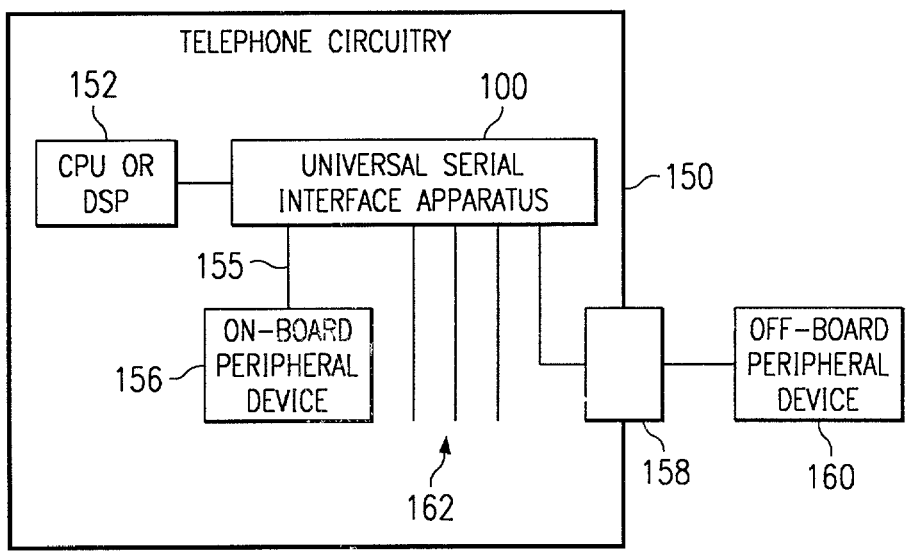
FIG. 1A is a block diagram showing of the hardware components and interconnections of a wireless telephone utilizing a universal interface according to the invention

FIG. 1A shows an illustrative hardware environment, including telephone circuitry 150 wherein the universal interface apparatus 100 is located. The universal interface apparatus enables communications between a central processing unit (CPU) or digital signal processor (DSP) 152 (or other control hardware/software) and peripheral devices 156, 160. The apparatus 100 includes processing circuitry that may be co-located, integrated, or even one-and-the-same with the CPU 152. In this example, the apparatus 100 has a number of input/output (I/O) lines 155. Some of the lines are coupled to a jack 158, enabling connection of the apparatus 100 to an "off-board" peripheral device 160 located apart from the telephone circuitry 150. The device 160 may comprise a component such as a multimedia card (MMC), etc. Other of the lines 155 are coupled to an "on-board" peripheral device 156 that is located on the telephone circuit 150, and accordingly hard-wired to the apparatus 100. The device 156 may comprise a component such as a radio front-end IC. The apparatus 100 includes still other lines 162, for connection to other peripheral device(s) (not shown).

Figure 1B:
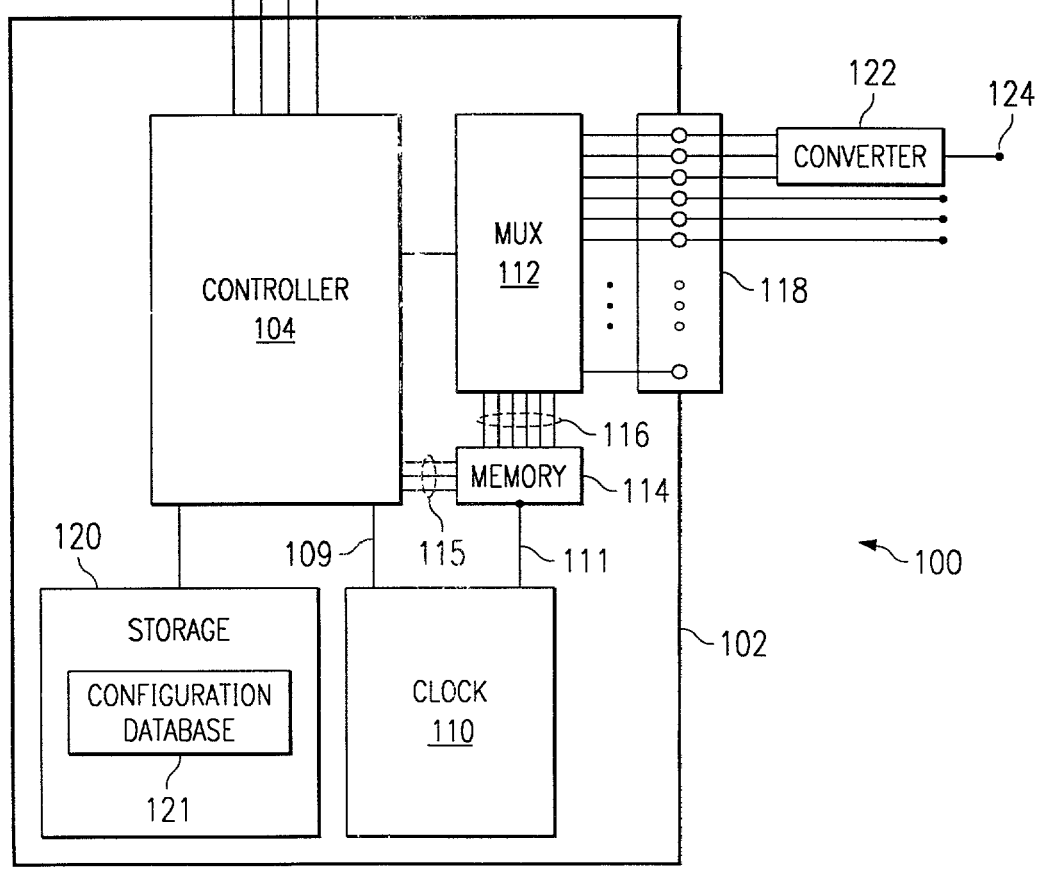
FIG. 1B is a block diagram of the hardware components and interconnections of a universal interface according to the invention.

The universal interface apparatus of this invention may be embodied by various hardware components and interconnections, one example of which is shown by the apparatus 100 of FIG. 1B. The components of the universal serial interface apparatus 100 include a controller 104, memory 114, storage 120, clock 110 and optional multiplexer 112 ("mux"). If desired, the foregoing components may be provided together on the same circuit structure 102, such as an application-specific integrated circuit (ASIC). In this embodiment, the circuit 102 includes multiple pads 118 such as pins, connectors, ASIC pads, terminals, or other means to couple signal paths between the circuit 102 and off-circuit devices to which the apparatus 100 is providing an interface.

In one embodiment, the apparatus provides an interface between a main processor (not shown, e.g., CPU 152) and the off-circuit, "peripheral" device. For communications with the main processor, the controller 104 includes numerous I/O lines 130. The controller 104 communicates with the peripheral device via the memory 114, pads 118, and optionally the converter 122 and mux 112. In another embodiment, the controller 104 and main processor may be co-located or even provided by the same device. For instance, the controller 104 may perform one application program involving main processor duties, and another, concurrent application program involving operation of the interface 100.

As shown in greater detail below, the controller 104 serves to selectively reconfigure components such as the clock 110, and memory 114, to interface a general purpose processor with an off-circuit, communications device attached to the pads 118. Additionally, by utilizing techniques such as time multiplexing using mux 112, the controller 104 may further direct the apparatus 100 to concurrently interface with multiple off-circuit devices coupled to the pads.

Considering the components of FIG. 1B, the controller 104 comprises one or more microprocessors, microcontrollers, or other digital data processing devices. The controller 104 is coupled to storage 120, which can preferably comprise nonvolatile storage suitable to store the controller's operating instructions in software or firmware. Nonvolatile memory can also be utilized in some designs. The storage 120 may include read-only memory such as EPROM, EEPROM, random access memory (RAM) with battery backup, or any other suitable storage. The storage 120 contains a database, lookup table, linked list, or other data structure cross-referencing different peripheral device types with certain operating parameters for the components of the apparatus 100, including optional pad-memory routing (multiplexer 112), clock cycle (110), and data content. Without any intended limitation, this data structure is referred to as a "configuration database" 121. For each peripheral device type, the configuration database 112 lists the pad assignments, appropriate pad routing between memory 114 and pads 118, preferred clock reference signal, and various details about the format of communications under the device's interface protocol.

For ease of reference, TABLE 1 (below) provides one simple illustrative example of configuration database 121 for a serial peripheral device.

TABLE 1

EXEMPLARY CONFIGURATION DATABASE 121

| PERIPHERAL DEVICE TYPE | PADS | CLOCK | CONTENT |
| --- | --- | --- | --- |
| Serial Peripheral Device | pad 1 = CLK (unidirectional)<br>pad 2 = EN (unidirectional)<br>pad 3 = DATA OUT (unidirectional)<br>pad 4 = DATA IN (unidirectional)<br><br>connect pads 1-16 to memory pins 40-55 | 5 Mhz | word length: 8 bits<br>parity: even<br>stop bits: 1<br>length of data transaction<br>run time content<br>how to capture data (e.g., rising edge)<br>whether to generate interrupt when each transaction finishes<br>identification of hardware event with which to synchronize starting data transfer<br>ping-pong mode for continuous data streams |

In addition to the storage 120, the controller 104 is also coupled to the memory 114, which comprises one or more RAM circuits providing a first set of input/output (I/O) lines 115, and a second set of I/O lines 116. The memory 114 exchanges data with the controller 104 via the I/O lines 115. Under direction of the controller 104, the mux 112 interconnects the I/O lines 116 with selected pads 118.

The apparatus 100 also optionally can include a converter 122 interconnected between a converter I/O line 124 and various pads 118. The converter 122 may include a digital-to-analog converter, converting digital signals received on the pads 118 into an analog output on the line 124. Alternatively, or in addition, the converter 122 may include an analog-to-digital converter, converting analog signals received on the line 124 into digital output signals on the pads 118.

As mentioned above, the controller 104 may be implemented in various forms. As one example, the controller 104 may comprise a digital data processing apparatus, as exemplified by the hardware components and interconnections of the digital data processing apparatus 200 of FIG. 2.

The apparatus 200 includes a processor 202, such as a microprocessor or other processing machine, coupled to a storage 204. In the present example, the storage 204 includes storage 206, as well as nonvolatile storage 208. The storage 206 may comprise random access memory ("RAM"), and may be used to store the programming instructions executed by the processor 202. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

In contrast to the digital data processing apparatus discussed above, a different embodiment of the invention uses logic circuitry instead of computer-executed instructions to implement the controller 104. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Figure 3A:
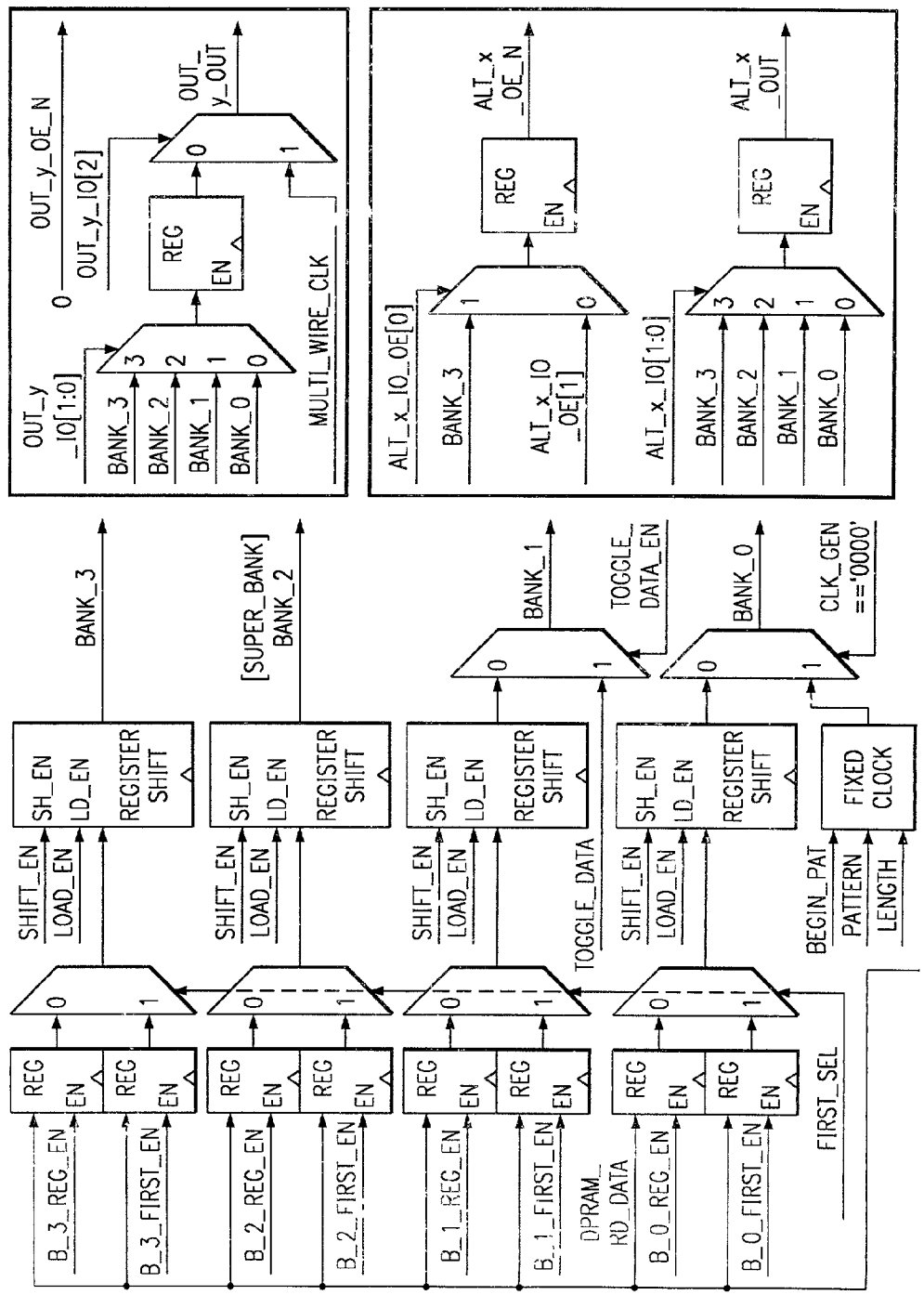
FIG. 3 shows a more detailed block diagram of a universal interface in accordance with the invention.
Figure 3B:
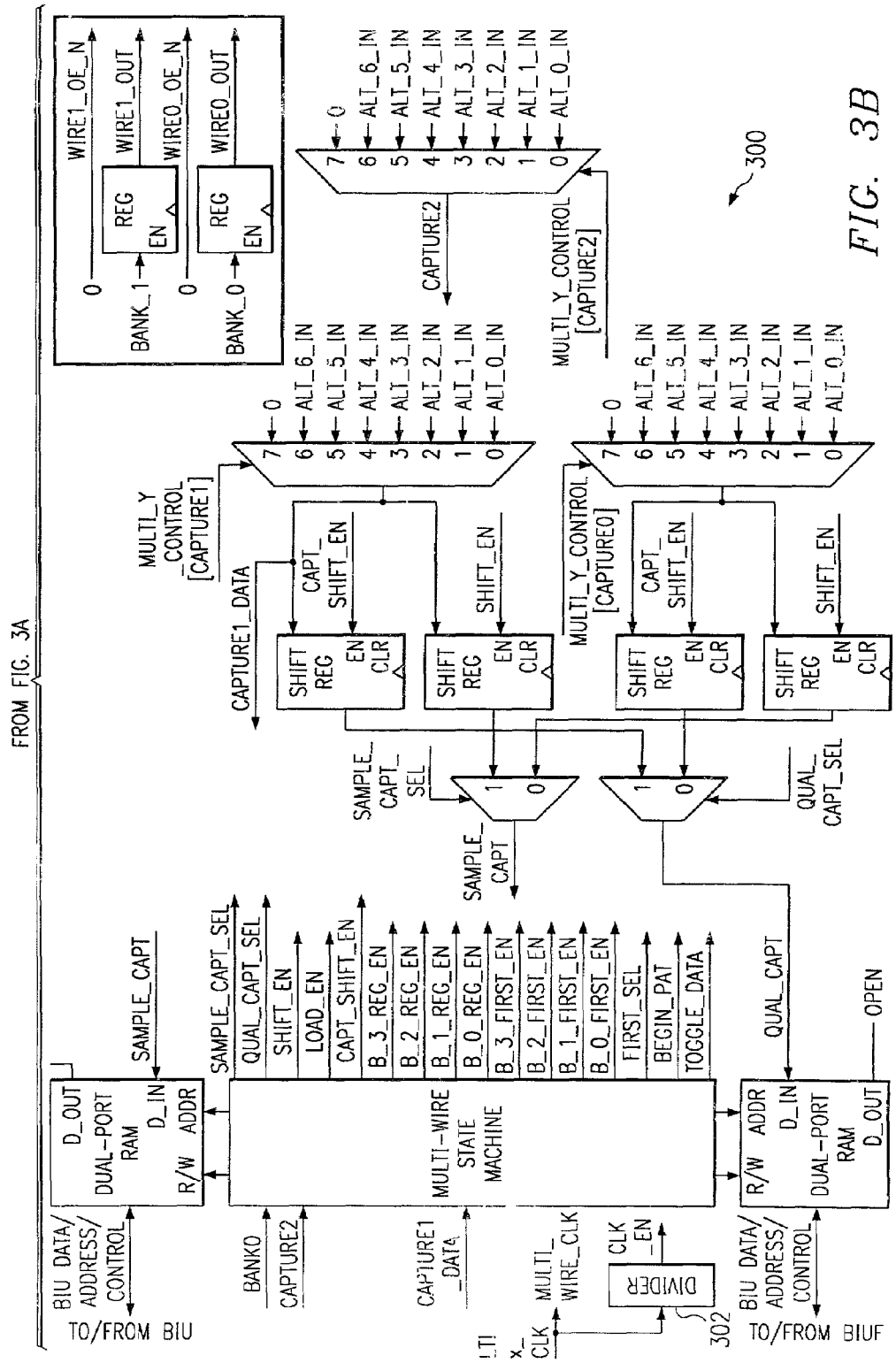

A more detailed example of one embodiment of a universal interface apparatus (UIA) 100 in accordance with the invention is shown in FIG. 3. UIA (also referred to as a multi-wire core) 300 is able to set up an entire transaction before the transaction begins. The UIA can be programmed to generate an interrupt at the end of the transaction. Apparatus 300 includes 4 Banks (B), B1, B2, B3) and 2 Capture Banks (C), C1) which are explained in detail below. To interact with the peripherals, the apparatus 300 includes 11 pads that are multiplexed with general-purpose input/output (GPIOs) devices. These 11 pads (peripheral interconnections) are broken further down to 2 Wires (W0, W1), 2 Outs (O0, O1) and 7 alternates (A0-A6). The UIA 300 provides the necessary routing and the state control so that the memory in the 4 Banks can be used to communicate with a wide range of devices connected to the 11 pads. It is worth noting that the UIA can be designed to support any number of pads depending on the particular application requirements.

In this preferred embodiment, the Banks of memory are dual-port memories. The user can program an offset (aligned to 32-bit words) in this memory. In addition, the user can program the number of bits the transfer comprises. This feature allows multiple messages to be stored in memory. Some definitions of signals/lines found in FIG. 3 follow:

Definitions of Signal/Lines for Apparatus 300:

Alternate (A0, A1, A2, A3, A4, A5, A6)—These pads can be inputs, outputs, or bi-directional pads and may be routed to C0/B2 or C1/B3 when used as inputs or bi-directional.

Bank (B0, B1, B2, B3)—A logical memory unit or the data associated with it at that bit. Each Bank contains data that can be (1) outputted to a pin, (2) inputted from a pin, or (3) both outputted to a pin and inputted from a pin. B3 has the distinction that it can be an output enable for the Alternates above. B0 has the distinction that it can be the Fixed Clock as described below. B1 has the distinction that it can be driven from a toggling control.

Bit—A bit ("0" or "1") in the Banks or Capture Banks. If a fixed clock is not used, a Bit of data is used (both input and output) on every Bit Clock. If a fixed clock is used, a Bit of data is used (both input and output) on every fixed clock length of the Data Clock.

Capture Bank or Capture (C0, C1)—A logic memory unit or the data associated with it at that Bit. Each Capture Bank stores the inputted data. The capture data can be qualified with the appropriate edge of B0. Table 2 below details the use of each Bank and Capture Bank.

TABLE 2

| Name | Direction | Special | Note |
|---|---|---|---|
| B0 | Output | Fixed Clock | |
| B1 | Output | Toggle Data | |
| B2 | Input, Output | Super Bank | |
| B3 | Input, Output, Output Enable | Output Enable | |
| C0 | Input | | |
| C1 | Input | | |
| C2 | Input | Used for input clock. | Has no memory associated with this Capture. |
| SuperBank | Output | Only in Bulk Transfer Mode | Uses B2 routing in this mode. No data capture allowed |

Out (O0, O1)—These pads are outputs, but may come from any of the Banks or be the Multi-Wire Clock.

Multi-Wire Clock—The clock that is provided by the clock system. This clock can be outputted on the Out pads.

Divided Clock—Period of time equivalent to the Multi-Wire clock divided by a divide_ratio.

If the divide ratio is set to zero, the Multi-Wire Clock and the Divide Clock are identical.

Bit Clock—Rate at which data comes out at some pins if Fixed Clock is not used.

If Input Clock is not used, this is equivalent to the Divided Clock. If Input Clock is used, it is equivalent to detecting edges on the Input clock (rising, falling or both) using the Divided Clock.

Fixed Clock—Derived (drawn out) using Bit Clock. If enabled, B0 outputs Fixed Clock and data is output at a rate equivalent to Bit Clock* FIXED_CLOCK_LENGTH Data Clock—The clock used to clock the external component. It is B0 or the Fixed Clock. Pads—These include Wires, Outs, and Alternates. The feature of each is diagrammed below in TABLE 3:

TABLE 3

| Type | Instances | Direction | Source | Destination |
|---|---|---|---|---|
| Wire | W0, W1 | Output | B0, B1 (fixed) | N/A |
| Out | O0, O1 | Output | B0, B1, B2, B3, Multi-wire Clock | N/A |
| Alternate | A0, A1, A2, A3, A4, A5, A6 | Input, Output, Bi-Dir | B0, B1, B2, B3 | C0/B2, C1/B3, C2 |

Part (partA, partB)—In continuous transfer mode (ping-pong mode), each Bank and Capture Bank (or SuperBank in bulk transfer mode) is split up into 2 equal parts. These are called partA and partB. The transaction begins with partA.

SuperBank—A large bank of memory that is used for a bulk transfer (discussion of a bulk transfer will be discussed below). It combines all Banks and Capture Banks to create a large logical piece of memory. The routing for the Super-Bank is same routing for B2. The size of the SuperBank in this embodiment is 768×32, although different memory sizes can be used in other designs.

Wire (W0, W1)—One of the pads of the multi-wire interface. These pads are outputs and are fixed. W0 is the output of B0 (or the fixed clock). W1 is the output of B1 (or the toggle data). Look at "Pads" for more information.

Illustrative Configurations for UIA 300

Some illustrative configurations (modes) that UIA 300 can be configured into will now be discussed in order to get a better understanding of the invention. The different configuration mentioned will support different types of peripheral devices.

4 Outputs Configuration

In a 4 output configuration, each of the 4 Banks (B0, B1, B2, B3) has data that will be clocked out at each of the Bit Clock. For example, B0 can be treated to have the pattern for the clock, B1 to have the pattern for the device enable, and both B2 and B3 to have data. An example of data for the 4 Banks is shown in Table 4.

TABLE 4

B0: 0101 0101 0101 0101 0101 0101 0101 0101
B1: 0000 1111 1111 1111 1111 0000 0000 0000
B2: 0000 1100 1111 0000 1100 0000 0000 0000
B3: 0000 0000 0011 0011 1111 0000 0000 0000

In this example, if the UIA 300 is set to transfer 32 Bits of data, there would be 16 cycles of the Data Clock (which is B0). Of these cycles, only 8 had the device selected. If B2 and B3 represented data MSb (Most Significant bit) to LSb (Least Significant bit) on the positive clock edge, the data 10110010 would have been transferred on one of the data pins and 00010111 would have been transferred on the other data pin. In the same mode, 3 Outputs, 2 Outputs, and 1 Output will be subsets of this mode. To be strictly complete, there can be a 5-output mode that is a superset of the 4-output mode when using a clock pass though mode.

3 Outputs, 1 Input Configuration

In this mode, 3 Banks (B0, B1, B2) will have data to be clocked out at each Bit Clock. One Bank (B3) will store the input data. Once again, B0 will be treated to be the clock pattern (Data Clock), B1 to have the pattern for the device enable. B2 will have the output data and B3 will have the input data. The user will program B0, B1, and B2 as in the 4 Outputs mode. B3 will be present after the transfer.

If the user programs B0, B1, and B2 with the values from TABLE 4 and after the completion of the transfer, the user reads the data in B3, the user sends out 16 clocks of which 8 cycles had the peripheral enabled. The user sent out the data 10110010 and read back the data 00010111. However there will be 32 bits of data in the read back register for B3 ("0000010111000000" is what would be read from C1 if rising edge capture). In the same mode, 2 Outputs/1 Input, and 1 Output/1 Input will be a subset of this mode. This mode is particularly useful for SSP peripherals.

2 Outputs, 1 Bi-directional Configuration

In this mode, 2 Banks (B0, B1 ) will have data to be clocked out at each Bit Clock. One of the output pads will be a bi-directional pad. The output enable will be controlled by the data in B3. The output value will be programmed into B2 (when B3 is set to output '0') and the input data will be read from B2 (corresponding to when B3 is set to an input '1').

After the transaction of 32 Bits, there are 16 Data Clocks of which during 8 cycles the peripheral is enabled. The pattern that was outputted was 1010 and the inputted data was 1010. Note, that typically, longer patterns (usually bytes) are transferred in each direction and the input and output pattern are not interleaved as this short example illustrates. This mode is useful for talking to several analog front end circuits (AFEs).

Note: If 2 inputs are routed to C0/C1, the output enable of the pin routed to C0 will be used to qualify capture into both C0 and C1. Therefore if 2 pins are routed into C0 and C1, both their output enables should be same, i.e the should both be input or bi-directional. However this is not recommended. Note if B0 is the Fixed Clock, then the pad associated with B0 should always be an output.

A discussion on how the pads (I/O interconnections) are mapped in order to accommodate the needs of a peripheral device now will be discussed.

Pad Mapping

The banks are mapped into the different wires, output, and alternates. W0 is always an output and maps to B0. Likewise W1 is always an output and maps to B1. O0 and O1 are always outputs from any of the 4 banks or the clock bypass. Each of A0-A6 can be an input, an output, or a bi-directional from any of the banks (bi-directional control is in B3). Note, that only 2 pads can be inputs at the same time since there are only 2 Capture Banks in the UIA 300. While it is true that the multi-wire could have had only 1 class of outputs instead of 3 with a superset of features, the additional controls will not have provided the ability to control more devices. In addition, the three classes of pads allow a user to begin using the multi-wire interface while understanding fewer of the more advanced features.

Capture Mode

To aid parsing of the data, the user can set some parameters to capture the incoming data into the UIA 300. Data can be captured into B2/C0 and B3/C1. B2 and B3 will capture data every Bit Clock if the Fixed Clock is not used or at the last phase of the Fixed Clock if Fixed Clock is used. Capture into C0/C1 allows more flexibility. For C0/C1, the user can decide only to capture the data on the positive edge of the Data Clock (B0), negative edge of the Data Clock (B0), both edges of the Data Clock, or all the data. Also capture into C0/C1 is qualified with the output enable of the pin that is routed to C0/C1. If all data is captured, C0 will mirror B2 and C1 will mirror B3 provided the alternate pin going to C0/B2 or C1/B3 is assigned as input during whole transaction. To ensure data is captured correctly into C0/C1, the restriction is placed that only 2 edges may be used to latch in data every time a fixed_clock cycle is drawn out.

After a transaction, B0 at output alternate pin will hold value. Starting another transaction may cause an unwanted edge at beginning of the next transaction which will cause an unwanted capture. For example, using the positive edge capture only, there would only be 4 bits in C0 (or C1) that the user would have to read instead of parsing 32 bits for the 4 bits of input data. B0 is special in that it is used for the clock in these modes.

As a precaution, in some advanced clocking modes (namely, fixed clocks), only the positive and negative edge modes will guarantee that the capture buffers will be large enough to capture the entire data stream.

Note at the end of a transaction, the capture shift registers are never cleared. Therefore, if one transaction had 32 bits of captured data and the next transaction had 10 bits of captured data, the MSB 22 bits of the shift register will hold old value after the second transfer. It is up to the software to know how many bits has been captured during each transaction.

Advanced Clocking

The clock for the multi-wire interface is provided by the system clock (not shown in FIG. 3). Inside the UIA 300, the user can divide the clock down using the divider 302. The divide is controlled by a clock enable. There is three advanced clocking modes of the UIA 300: fixed clocks, clock pass through, and input clock.

Fixed Clock Mode

The UIA 300 has the ability to output a fixed clock of length 2-8 Divided Clock. The pattern is programmable. Most often, the fixed clock should be "0110" and have a length of 4. This pattern is advantageous since it the pattern has a 50-50 duty cycle and the pattern starts and end at the same level. With the fixed clocks, since the user does not "draw" the Data Clock and the associated signals, the user can pack the output data and the input data in B1, B2, and B3 (in the appropriate modes). This feature allows easy parsing and allows for larger messages. A maximum of 2 edges of the fixed clock should be used while capturing data. Otherwise, multi wire will not be able to capture all data.

Clock Pass-through Mode

The clock-pass through allows the multi-wire O0 or O1 pad to output the Multi-wire Clock. This feature allows a very fast clock relative to the multi-wire's update rate (since most likely, a large divide ratio will be used) to be synchronized and outputted to the pad. This mode is useful for stereo codecs peripherals as an example. The control for this mode is present at the control for the Outs. Note, since the bypassed clock is being generated by CKS, the jitter and duty cycle of the clock is controlled in the CKS block. The clock pass through can be simultaneously used with the other advanced clocking features.

Input Clock Mode

Another advanced clocking feature is the input clock. For simplicity, the input clock is actually a sampled clock enable. One of the alternate (A0-A6) is routed to C2. This will be used as the input clock. The multi-wire interface shall sample the input clock for transitions (positive, negative or both) using the multi-wire's Divided Clock; therefore, the multi-wire's clock after the divide ratio must be sufficient enough to meet the timing on the input clock interface.

When the correct transition is detected, on the next Divided Clock, the next bit of data will be outputted and inputted. The input clock is useful if an SSP is in a slave mode.

Continuous Transfer

To aid in the continuous transfer of data, a "ping-pong" mode is available. In this mode, each bank is divided in 2 halves: partA and partB. PartA occupies the half of the Bank with the lower addresses.

After the user tells the UIA 300 to begin a transfer with ping-pong mode, the UIA transfers data from partA of each bank. After the partA transfer, the multi-wire begins the partB transfer. Afterwards, the UIA goes to partA, etc. If interrupts are enabled, an interrupt is generated at both the end of partA and partB. Typically, the user will set up data in both partA and partB; begin the transfer (with both ping-pong and interrupts). After an interrupt, the user will load (or read) the data into (from) the completed part before the next interrupt.

Since the banks are divided into 2 halves, the user must be careful to use valid size (maximum of half of the non-ping-pong mode) and valid offset. The same offset and the same size are used for both partA and partB. Also, in this mode, the BUSY indication will never indicate that the transfer is complete. To stop the ping-pong transfer, one must disable the ping-pong mode and the transfer will complete after the current transfer. Note, a minimum size of 65 bits is required during ping_pong mode per ping pong transfer. It is up to the user to make sure that interrupts are not missed if interrupts are enabled in the continuous transfer mode. This mode is useful for any interface that needs continuous transfer of data such as SSP, the FM interface (in a wireless telephone), and I2S.

MSB to LSB

The user selects the direction of packing on the multi-wire interface's word. Since the interface to the multi-wire is a 32-bit word, there can be 2 different packing options allowed. One is from LSb to MSb (bit 0 to bit 31 of each word) and the other is MSb to LSb (bit 31 to bit 0 of each word). This control is usefull since some external devices require the serial data to be from MSb to LSb while other requires the opposite.

Bulk Transfer

To provide an interface for a large amount of output data, a bulk transfer mode is provided by UIA 300. In this mode, B0, B1, B2 , B3, C0, and C1 are combined into one SuperBank. The SuperBank allows for a large single transfer of data. Ping-pong mode can also be allowed in this mode. However, in the bulk-transfer mode, only one stream of unique output data is allowed. The other streams shall be "canned". For example, the other output data streams can be the Data Clock and a fixed division of the clock.

This mode is useful for stereo codecs. For example, one stereo codec requires a 384 over-sampled clock. Also, it requires a system clock and a left/right clock and data. In this mode, one of the OUT outputs can be used to provide the multi-wire's clock. The Multi-wire Clock is divided by 192 to provide the SCLK. The LR clock comes from the dividing the Data Clock by the appropriate ratio in the toggle data control.

The UIA 300 has a programmable toggle mode that toggles a B2 from a initial state to the invert state on a multiple of the Divided Clock. Note that in bulk transfer, no data should be captured. Also B0, B1 or B3 should not be routed to any outputs. B3 should not be used as output enable.

Updating of Outputs

As a general rule, the outputs of UIA 300 are updated only during a transfer. The only exception of this rule is if the Fixed Clock or any of the dedicated hardware Chip Selects are routed to the outputs. If any Chip Select is routed to output, its "IDLE" bit will show up immediately at output pins. If Fixed Clock is routed to the output, the 'CLK_SENSE' bit will immediately show up at the output.

Having described the structural features of the present invention in detail, the method aspect of the present invention will now be described. Although the present invention has broad applicability to interfacing many different types of devices, the specifics of the structure that has been described is well suited for use in wireless telephone circuitry such as mobile baseband chips, and the explanation that follows will emphasize such an application of the invention without any intended limitation.

In the context of FIGS. 1-2, such a method may be implemented, for example, by operating the controller 104, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to universally interface between a variety of different digital data processing devices by the generation, storage, proper routing, and timed output of data signals to simulate behavior of a traditional interface device dedicated to that particular communications protocol.

This signal-bearing media may comprise, for example, RAM (not shown) contained within the storage 120, as represented by the access storage 206. Alternatively, the instructions may be contained in another signal-bearing media, such as a magnetic data storage diskette 300, directly or indirectly accessible by the processor 202. Whether contained in the storage 206, diskette 300, or elsewhere, the instructions may be stored on a variety of machine-readable data storage media, such as direct access storage (e.g., a conventional "hard drive", redundant array of inexpensive disks ("RAID"), or another direct access storage device ("DASD")), magnetic tape, electronic read-only memory (e.g., ROM, EPROM, or EEPROM), optical storage (e.g., CD-ROM, WORM, DVD, digital optical tape), or other suitable signal-bearing media including transmission media such as digital and analog and communication links and wireless. In an illustrative embodiment of the invention, the machine-readable instructions may comprise software object code, compiled from a language such as "C," etc.

In contrast to the signal-bearing medium discussed above, the method aspect of the invention may be implemented using logic circuitry, without using a processor to execute instructions. In this embodiment, the logic circuitry is implemented in the controller 104, and is configured to perform operations to implement the method of the invention. The logic circuitry may be implemented using many different types of circuitry, as discussed above.

Overall Sequence of Operation

FIG. 4 shows a sequence 400 to illustrate one example of the method aspect of the present invention. The sequence 400 illustrates one specific embodiment of the invention, including the construction and use of a multi-function handheld telephone employing the UIA according to the invention. For ease of explanation, but without any intended limitation, the example of FIG. 4 is described in the hardware context of the apparatus 300 described above.

In step 402, technicians construct a telephone utilizing circuitry in accordance with this invention. In one example, this telephone comprises a digital cellular telephone such as a personal communications system (PCS) phone or other type of electronic device. Step 402 occurs at one or more factories, assembly plants, or other manufacturing sites, and may include various steps of construction performed at separate locations. Construction of the telephone includes electrical placement of the apparatus 300 between a general purpose processor and one or more peripheral devices such as frequency modulating circuits, memory cards, audio inputs, analog "front end" chip sets, and the like. Alternatively, the controller 104 may be integrated with the general purpose processor. The telephone may be provided with multiple instances of the apparatus 300 in order increase the number of peripheral devices that can be concurrently interfaced with the general purpose processor. For ease of explanation, the following description discusses the embodiment where the telephone only includes one instance of the UIA 300.

In step 404, technicians program the controller 104. In the illustrated example, this is performed by storing operating software and/or firmware in the storage 120 by downloading files, electrical programming, "burning-in" code, programming a logic device, etc. Among other programming, step 404 includes storage of the database 121, which contains configuration data for a prescribed assortment of peripheral device "types" a mentioned above. Each type of peripheral device type utilizes a different communications protocol, such as for supporting an internal device found in the telephone, a communication protocol for supporting a MMC that is attached to the telephone, etc. Furthermore, there may be multiple peripheral device types corresponding to a particular model of device, for example where the different types utilize different levels of performance, different communications protocol where the device model is compatible with multiple protocols, etc. Step 404 can also occur over-the-air using wireless communications once the device is in service or later on at a service center (i.e., updated in field). Upon programming of the telephone in step 404, one of the peripheral device types may be designated as a default.

In step 406, the customer begins using the telephone, for example by turning it on. In step 408, the controller 104 properly configures itself to communicate with the specific type(s) of attached peripheral devices. Namely, the controller 104 recognizes the type(s) of attached peripheral device(s), and acts to configure the clock 110, memory 114, and optional mux 112 (if peripherial multiplexing is required) to simulate a dedicated hardware interface compatible suited to the type of attached peripheral device. The detailed operation of the controller 104, clock 110, memory 114, and mux 112 is discussed in greater detail below. The controller 104 may recognize the attached device types (step 408) in various ways, such as by having been programmed during manufacture of the wireless telephone, over-the-air programming, receiving notification occurring by user activation of a menu, detecting insertion of a particular size/shape of hardware plug, etc.

In step 410, the apparatus 100 operates according to the configuration ("mode") established in step 408. In step 412, the controller 104 determines whether there has been any change in the peripheral device function. For example, step 412 senses physical replacement of the peripheral device with a different type device, user activation of the telephone's menu to select a different peripheral device type, etc. In the absence of a change, step 412 returns to step 410, where the controller 104 continues to operate in the same mode. In the alternative, peripheral device changes cause step 412 to advance to step 414, where the controller 104 reconfigures the components of the apparatus 104 to operate according to the new device type.

FIG. 5 shows a configuration sequence 500 in accordance with the present invention. Namely, FIG. 5 more specifically depicts the configuration (and reconfiguration) and operation of the apparatus 100 during the process of interfacing with a peripheral device. For ease of explanation, but without any intended limitation, the example of FIG. 5 is described in the particular context of the interface apparatus 300 described above. Ordinarily skilled artisans will recognize that, although operational sequences must be set forth in some specific order for the purpose of explanation, but the present invention contemplates various changes beyond such specifically illustrated order.

In this example, the apparatus 300 is compatible with a predefined list of peripheral device "types", where each device type concerns a different communications protocol.

The sequence 500 begins in step 502, where the apparatus 100 receives notification of a new peripheral device type with which to begin communications. This notification may identify a new peripheral device to the apparatus 100 (e.g., MMC inserted into the wireless telephone), or a substituted peripheral device to replace a peripheral device that is already communicating with the UIA 300 as examples. This new peripheral device is referred to as the "current" peripheral device. The notification of step 502 is provided to the controller 104 by the CPU 152 (FIG. 1A), and may arise in various ways.

For example, the detection of a peripheral device may be originated by user activity. Namely, the CPU 152 may be programmed to provide a user-operated feature menu. In this case, the user's entry of certain menu selections specifies activation of a new peripheral device. In turn, the CPU 152 notifies the interface apparatus 100 of the selected peripheral device, which occurs in step 502. Examples of the user's selection include entry into an analog-only communications mode (requiring the apparatus 100 to communicate with an on-board analog chip set), or entry into a digital-only communications mode (requiring the apparatus 100 to communicate with an on-board digital chip set). In another case, notification of the new peripheral device arises by other user activity, such as coupling a hands-free headset into the junction module 162, whereupon the CPU 152 senses the insertion of the headset and passes notification to the apparatus 100 in step 502. In still another case, notification arises when the telephone circuitry detects certain operating conditions, such as loss of digital signal coverage resulting in the need to utilize an on-board analog chip set. In still another case, the notification of step 502 arises when a timer expires for one reason or another, for instance when the pads 118 are being time-shared between different peripheral devices as discussed below.

Responsive to the notification of the peripheral device type in step 502, the controller 104 begins to configure the components of the apparatus 100 accordingly. First, the controller 104 cross-references the configuration database 121 to retrieve the appropriate operating parameters for the present peripheral device type identified in step 502. Then, the controller 104 begins to configure the components of the apparatus 100.

For instance, in step 504 the controller 104 configures the optional multiplexer 112 to connect the appropriate pads 118 to the appropriate memory I/O lines 116 in the case more than one device will be supported at one time using the same pads. This step also includes assigning the appropriate pads that are needed to support the peripheral device as either input, output, or bi-directional. This operation may also be referred to as "routing." Step 504 only changes pad/memory routing for the pads that will be used for the new peripheral device (identified in step 502); pads and memory I/O lines 116 that are already in-use may be left alone. In step 506, the controller 104 configures the clock 110 if required to provide the desired frequency, duty-cycle, waveform, and other characteristics of the reference signal required by the protocol of the detected peripheral. After steps 504 and 506, the controller's configuration of the apparatus 100 is complete. Now, the controller 104 proceeds to the exchange of data between the CPU 154 and peripheral device. The configuration may relate to message length, parity, stop bits, and other specifics relating to the communications protocol utilized by the current peripheral device.

In step 508 it is determined, if the peripheral device detected in step 502 is an output device in that it only receives data from the apparatus 100, or an input/output device that also receives data from apparatus 100, the routine moves to step 510. In step 510, data to be sent to the peripheral device is loaded into appropriate memory 114 in preparation for transmission. If any data has been loaded into the memory from the CPU (as described in step 510), step 512 involves the memory outputting this data to the peripheral device via the pads 118. This digital data output to the pads 118 may be further converted into analog signals at the line 124 by the optional digital-to-analog converter 122. In step 514, it is determined if the peripheral device is an input/output device which requires data to be received from the peripheral device at device 100. If the answer in decision step 514 is yes or if in decision step 508 the answer is no, data sent by the peripheral device is read back from memory in step 516. In step 518, it is determined if the transaction with the peripheral device is complete, if it is, the routine is stopped in step 520. If the transaction is not complete, the routine returns to step 508. The routine 500 may restart upon notification of a peripheral device type, which may be the same or different than the last time the routine 500 was performed. If the device is being reconfigured, the transaction would end and go to step 520. At which time the overall routine is in step 412, and would then go to step 414 to reconfigure the controller that would start the routine of FIG. 5 again at step 502 in order to perform the reconfiguration.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

Additionally, ordinarily skilled artisans will recognize that operational sequences must be set forth in some specific order for the purpose of explanation and claiming, but the present invention contemplates various changes beyond such specific order.

What is claimed is:

1. A universal interface device, comprising:
   a controller;
   a configuration database coupled to the controller, said configuration database having stored therein a plurality of different configuration protocols for supporting a plurality of different peripheral devices;
   a plurality of interconnection pads;
   a memory coupled to the interconnection pads and controller, the memory is programmable by the controller in order to support any of the different peripheral devices; and
   a multiplexer coupled between the memory and the plurality of interconnection pads wherein the universal interface device concurrently interfaces with the plurality of different peripheral devices using time division multiplexing of the plurality of interconnection pads.

2. A universal interface device as defined in claim 1, wherein the controller comprises a state machine.

3. A universal interface device as defined in claim 1, further comprising a programmable clock coupled to the memory or the configuration database.

4. A universal interface device as defined in claim 1, wherein the controller selects a configuration protocol from amongst the plurality of configuration protocols in the configuration database, and uses the selected configuration protocol to configure the memory in order to support the peripheral device from amongst the plurality that is coupled to the plurality of interconnection pads.

5. A universal interface device as defined in claim 2, wherein the state machine includes a programmable routing and mapping scheme that allows the state machine to communicate with more than one peripheral device that is coupled to the plurality of interconnection pads.

6. A universal interface as defined in claim 2, wherein the memory can be divided up by the state machine into two or more parts in order to support a peripheral device coupled to the interconnection pads that requires continuous transfer of data, the state machine switching between the two or more parts of the memory during data transfer to the peripheral device.

7. A universal interface as defined in claim 2, wherein the state machine sets a portion of the memory to provide a tri-state control if one or more of the plurality of interconnection pads have to function as both an input and an output.

* * * * *